Patented June 24, 1930

1,767,646

UNITED STATES PATENT OFFICE

GEORGE S. BRATTON, OF ST. LOUIS, MISSOURI, ASSIGNOR TO ANHEUSER-BUSCH, INCORPORATED, OF ST LOUIS, MISSOURI, A CORPORATION OF MISSOURI

PROCESS FOR MANUFACTURING YEAST

No Drawing.    Application filed March 6, 1926. Serial No. 92,957.

This invention relates to the manufacture of yeast, and particularly, to processes of the kind which contemplate initiating propagation of yeast in a dilute wort, and thereafter adding or feeding into same a highly concentrated wort that contains yeast nourishing materials.

In one process of the general class above referred to, described in German patent to Ranier, No. 10,135, dated October 12, 1879, a special wort consisting essentially of sacchariferous material and peptone-containing material is first prepared, said wort is seeded with yeast, air is then blown into same, so as to promote propagation of yeast, and thereafter a more highly concentrated wort, consisting of peptones and sugars mixed in a certain ratio, is added to the propagating wort. In another process of the same general class, described in U. S. Patent No. 1,449,105, to Hayduck, dated March 20, 1923, a conventional wort is first prepared, a portion of said wort is then used to form a very dilute initial setting, propagation of yeast is initiated in same by aeration, and thereafter the remainder of the original wort in a more highly concentrated condition, is added to or fed into the propagating wort substantially continuously. The alleged advantage of both of the processes above referred to is that a higher yield of yeast is obtained by reason of the fact that the alcohol produced by the fermentation is more completely utilized for yeast food.

I have discovered that if the initial setting is rich in yeast assimilable proteins and yeast nutrient salts and deficient in yeast assimilable sugars, and the highly concentrated wort which is thereafter added to the initial setting is rich in yeast assimilable sugars and deficient in yeast assimilable proteins and yeast nutrient salts, a higher yield of yeast can be obtained than is possible with a process in which the initial setting is of such a nature that considerable alcohol will be produced when the initial setting is seeded with yeast and then aerated, due to the fact that in such a process the air which is blown into the initial wort carries off the alcohol, thereby resulting in the loss of a substance, to wit, alcohol, which, if it were retained, would serve as a food for the yeast.

Accordingly, the main object of my invention is to provide a process for manufacturing yeast in which the initial setting is formed from materials that will neither volatilize nor give rise to any fermentation products of a volatile nature when subjected to aeration, thereby increasing the yield of yeast by eliminating the loss of any substance produced by the process that is capable of serving as food for the yeast.

Another object of my invention is to provide a yeast manufacturing process of the so-called "feeding in" class, in which the initial setting is of such a character that the culture medium has from the outset the highly beneficial value of the buffering, stabilizing and growth-promoting effect of the nutrient materials used to form the initial setting.

And still another object of my invention is to provide a practicable process for manufacturing yeast that can be accurately controlled so as to practically eliminate the production of alcohol during the operation of feeding in the sugar that is added to the initial setting.

Briefly described, my process consists in preparing in lieu of a normal wort two separate and distinct yeast nutrients, one rich in yeast assimilable proteins and yeast nutrient salts, such as phosphates, and deficient in yeast assimilable sugars, and the other rich in yeast assimilable sugars but deficient in yeast assimilable proteins and yeast nutrient salts, initiating propagation of yeast, preferably by aeration, in a solution of the protein and salt nutrient after said solution has been seeded with yeast and diluted to a low gravity, and thereafter, "feeding in" or adding the sugar nutrient to the fermenting wort, either intermittently or continuously during a substantial period of time while continuing the yeast propagation. In the foregoing brief description of my process and in the succeeding description and claims the expressions "rich" and "deficient" are used as comparative terms to indicate the distinction between the wort contemplated by my process and a "normal wort" in which the sugars form over two thirds of the total available food, the yeast assimilable proteins form approximately 20%, and the nutrient salts constitute less than 5%. By segregating the nutrient materials into two groups, as above described, the group that constitutes the initial setting will contain a preponderance of proteins and yeast nutrient salts that will not volatilize or produce yeast fermentation products of a volatile nature when subjected to aeration, except, perhaps, traces of fusel oil, which is of no material benefit in yeast growth. As the gravity of the initial wort should, preferably, be very dilute (between 1.0 and 2.0 Balling), its very tenuousness predisposes it to irregularity in its hydrogen ion concentration, unless it is well buffered. Accordingly, the incorporation of a large proportion of the total proteins and yeast nutrient salts in the initial setting produces another very desirable result, in that it insures substantially all of the required proteins and yeast nutrient salts being added at the beginning, with the result that the culture medium has from the outset the highly beneficial value of the buffering, stabilizing and growth-promoting effect of these nutrient substances.

During the subsequent propagation of yeast the second portion of the yeast nutrient materials, consisting very largely of yeast assimilable sugars, is added intermittently or continuously, in such a manner as to maintain only a fraction of 1% of sugar in the propagating wort. It is well recognized that the source of substantially all the ethyl alcohol of fermentation in the manufacture of yeast are the sugars. Accordingly, to feed yeast with more sugar than it can immediately digest results in a partial loss of the ethyl alcohol, particularly when the fermenting solution is strongly aerated. Thus, it will be seen that in my process, which contemplates starting with a liberal quantity of proteins and phosphates or other suitable yeast nutrient salts and thereafter adding the sugars only as the yeast is able to assimilate them, the production of alcohol is practically eliminated. In other words, my invention recognizes that there is a functional difference in the various components which collectively constitute a normal yeast nutrient solution and the time of introduction of these various components into the propagating solution varies accordingly. My discovery shows, as already pointed out, that the yeast assimilable proteins and yeast nutrient salts fulfill their respective functions best when introduced into the initial setting and that the assimilable sugars serve their purpose best when introduced slowly during the period of yeast propagation.

In practising my process I prefer to first prepare an initial setting or initial wort from materials rich in yeast assimilable protein compounds and yeast nutrient salts, but relatively poor with respect to a normal wort in sugar. A quantity of said wort, representing approximately 30% of the total solids to be used in the propagation of yeast, is then diluted to about 1.5 Balling in a fermenter and stocked with seed yeast in the usual manner. Thereafter, sugar preferably in the form of a sugar solution of a higher concentration, representing approximately 70% of the total solids, is added to or introduced into the initial setting either intermittently or continuously at such a rate that the sugar content of the fermenting solution will never exceed a fraction of 1%.

The particular materials used to prepare the initial setting and the method of preparing or combining said materials is immaterial, so far as my invention is concerned, but one convenient way of practising my process is to prepare an initial setting from the extract of malt sprouts, since such material contains an abundant supply of yeast assimilable proteins and yeast nutrient salts and little sugar. It is also immaterial from what source the sugar is obtained, but one convenient method is to prepare a sugar solution from cereal materials, such as corn or gluten feed from starch mills, with sufficient malt for conversion. Instead of using cereals to form the source of the sugar, cane or beet molasses may be used, or a mixture of two or more of said materials may be used.

From the foregoing it will be seen that my process has the following characteristics, which distinguish it from prior "feeding in" processes for manufacturing yeast that have been used or described in publications:

(1st) It contemplates the preparation of two complementary yeast nutrients, neither of which contains all essential yeast nutrients, but which will produce a yeast nutrient solution of normal composition when blended.

(2nd) It contemplates the use of an initial setting, which, when subjected to aeration, will not result in the production of volatile yeast food products that are allowed to go to waste.

(3rd) It contemplates incorporating the yeast assimilable proteins and yeast nutrient salts at a point in the process where they will be most beneficial.

(4th) It contemplates the use in the fermenting solution of many times as much protein as sugar, even though the sugar to be consumed by the process is about three times as much as the total protein consumption.

(5th) It contemplates withholding from the initial setting substantially all of the sugars and introducing them at the rate at which the propagating yeast can completely assimilate them.

(6th) It contemplates a segregation of the essential components of a yeast nutrient solution in two complementary worts so that each group may be introduced into the process of yeast propagation at the time and in the quantity most conducive to a high yield of yeast; and (7th) It contemplates feeding in one compound, i. e., sugar, to produce better results than were obtained in prior processes by feeding in a plurality of compounds, i. e., sugars, proteins, nutrient salts, etc.

Having thus described my invention, what I claim as new and desire to secure by Letters Patent is:

1. A process for manufacturing yeast, which consists in preparing an initial setting solution that is rich in yeast assimilable proteins, rich in yeast nutrient salts, and deficient in yeast assimilable sugars; preparing a feeding solution that is rich in yeast assimilable sugars, deficient in yeast assimilable proteins, and deficient in yeast nutrient salts; initiating propagation of yeast in said initial setting solution, and thereafter adding said feeding solution to said setting solution during a substantial period of time while continuing the propagation of yeast.

2. A process for manufacturing yeast, which consists in preparing an initial setting solution that is rich in yeast assimilable proteins, rich in yeast nutrient salts and deficient in yeast assimilable sugars; preparing a feeding solution that is rich in yeast assimilable sugars; deficient in yeast assimilable proteins, and deficient in yeast nutrient salts; seeding said setting solution with seed yeast; initiating propagation of yeast in said setting solution; and thereafter adding the feeding solution to the setting solution during a substantial period of time while continuing the yeast propagation.

3. A process for manufacturing yeast, which consists in preparing an initial setting solution that is rich in yeast assimilable proteins, rich in yeast nutrient salts, and deficient in yeast assimilable sugars; preparing a feeding solution that is rich in yeast assimilable sugars, deficient in yeast assimilable proteins, and deficient in yeast nutrient salts; diluting said initial setting solution to approximately 1.5 Balling, initiating propagation of yeast in said initial setting solution, aerating said initial setting solution; and thereafter adding said feeding solution to said initial setting solution at such a rate that the sugar content of the mixture of these said solutions does not exceed a fraction of 1% during a substantial period of time while continuing the propagation of yeast.

GEORGE S. BRATTON.